United States Patent [19]

Yamaguchi et al.

[11] 4,087,574

[45] May 2, 1978

[54] METHOD OF SUBBING PLASTIC FILMS

[75] Inventors: June Yamaguchi; Nobuo Tsuji; Takenori Omichi; Teruo Yamaguchi, all of Minami-ashigara, Japan

[73] Assignee: Fuji Photo Film Co., Ltd., Minami-ashigara, Japan

[21] Appl. No.: 687,818

[22] Filed: May 19, 1976

[30] Foreign Application Priority Data

May 19, 1975 Japan .................................. 50-59475

[51] Int. Cl.[2] ......................... B05D 1/36; B32B 27/08; B32B 9/04

[52] U.S. Cl. ............................ 427/407 F; 427/407 G; 428/474; 428/483; 428/910

[58] Field of Search ........................ 427/407 F, 407 G; 428/474, 483, 910

[56] References Cited

U.S. PATENT DOCUMENTS

| | | | |
|---|---|---|---|
| 3,271,178 | 9/1966 | Nadeau et al. .................... | 428/483 X |
| 3,681,127 | 8/1972 | Fowler et al. ......................... | 428/483 |

*Primary Examiner*—James R. Hoffman
*Attorney, Agent, or Firm*—Sughrue, Rothwell, Mion, Zinn and Macpeak

[57] ABSTRACT

A method of subbing plastic films, particularly for use in photography, comprising applying an aqueous subbing composition to a surface thereof, the aqueous subbing composition comprising a polymer prepared from 45 to 99.5% by weight of at least one monomer selected from the group consisting of vinylidene chloride and vinyl chloride; 0.1 to 15% by weight of at least one monomer selected from vinyl monomers having one or more alcohol groups in their side chains; and 0 to 54.4% by weight of at least one monomer selected from the group consisting of acrylates, methacrylates, acrylonitrile, methacrylonitrile, alkyl vinyl esters, and alkyl vinyl ethers.

16 Claims, No Drawings

METHOD OF SUBBING PLASTIC FILMS

BACKGROUND OF THE INVENTION

1. Field of the Invention

The present invention relates to a method of subbing photographic supports, more particularly, to a method of subbing plastic film supports for photographic elements employing an aqueous subbing solution containing one or more copolymers of vinylidene chloride and a vinyl monomer having an alcohol group in its side chain to provide tenacious adhesion between a support and aqueous organic colloid layers.

2. Description of the Prior Art

The invention will hereinafter be exemplified using polyester film as an example, which is one representative plastic film.

Polyester film is superior to other supports in properties such as mechanical strength, dimensional stability, heat resistance, chemical resistance, transparency, etc., and has been applied to photographic, printing, drafting, magnetic materials and the like. In recent years, its application has been markedly expanding. In particular, its demand as a photographic film support has rapidly increased in recent years, occupying an important position in photographic film supports.

As is well known, however, it is generally difficult to tenaciously adhere a hydrophilic organic colloid layer such as a photographic emulsion layer to a polyester film support since polyesters are extremely hydrophobic due to their high crystallinity, chemical inertness, lack of a good solvent therefore due to high chemical resistance, and the absence of hydrophilic groups. In the past, there have been many attempts to overcome this problem. One such attempt is to impart good adhesiveness by subbing. For example, the adhesive property of a polyester film can be improved by subbing an unstretched or monoaxially stretched polyester film with an aqueous latex of an acrylate or vinylidene polymer before it is biaxially stretched and thermally treated. This method, however, has a cost disadvantage by reason of, for example, the lack of reusability of a biaxially stretched film prepared by this method.

In order to strengthen the adhesion between a subbing layer and a polyester film, it is also known to heat the film and the subbing layer to a fairly high temperature, or to heat them under pressure. These methods, however, are accompanied by the danger of thermal deterioration of the base.

In order to improve the adhesion between a subbing layer and a hydrophilic organic colloid layer, there has generally been practiced a subbing method using a copolymer of a polymerizable unsaturated carboxylic acid such as acrylic acid, itaconic acid and the like.

As copolymers in which such a polymerizable unsaturated carboxylic acid is used as a copolymerization component, there are, for example, copolymers of an unsaturated carboxylic acid (4 to 12 wt%), styrene or acrylonitrile (30 to 48 wt%) and an acrylate (48 to 70 wt%) as described in U.S. Pat. No. 2,794,742; copolymers consisting of an unsaturated fatty carboxylic acid and at least one ethylenically unsaturated monomer as described in U.S. Pat. No. 3,349,703; copolymers of an unsaturated carboxylic acid and vinylidene chloride as described in published German Patent Application No. 1,811,543; vinyl acetate-acrylate-unsaturated carboxylic acid copolymers as described in Japanese Patent Publication No. 29,995/69; and the like.

These subbing layers, however, have the following disadvantages due to their increased hydrophilicity owing to the acid component, i.e., the carboxylic acids contained therein: Such a subbing layer swells in water, particularly, in an aqueous alkaline solution, resulting in a weakening of its film strength. Consequently, the subbing layer, when applied to a photographic film, is liable to be peeled off in an alkaline developing solution. In addition, the carboxylic acid component in the subbing layer is liable to adversely affect light-sensitive emulsion layers coated thereon, impairing photographic properties such as sensitivity, in particular, under high temperature and high humidity conditions.

SUMMARY OF THE INVENTION

It is one object of this invention to provide a method of subbing polyesters by which tenacious adhesion between polyester supports and photographic emulsion layers is achieved.

It is another object of this invention to provide a method of subbing which gives strengthened adhesive power both in the wet state during development and in the dry state after development, fixing and washing.

It is a further object of this invention to provide a subbing method employing a composition which is less liable to interact with photographic emulsion layers to exert adverse effects upon photographic properties.

It is still a further object of this invention to provide a subbing method capable of giving a practically useful adhesive power without any curing by means of heating after coating and drying of the subbing composition.

It is another object of this invention to provide a subbing method employing a subbing composition which is simple to prepare, handle and coat.

It is still another object of this invention to provide a method of subbing using an aqueous dispersion substantially free from pollution problems.

It is still another object of this invention to provide a method of subbing for preparing polyester films having good transparency and plainness (no unevenness is visually observable on the surface, e.g., such is typically seen as a rippling wave effect, if present).

It is a further object of this invention to provide a photographic light-sensitive element having tenacious adhesion between its support and photographic emulsion layers thereon.

Other objects of this invention will be apparent from the following description.

The above objects of this invention can be achieved by coating on a polyester film support an aqueous dispersion of a copolymer of 45 to 99.5% by weight, preferably 70 to 99% by weight, of at least one monomer selected from the group consisting of vinylidene chloride and vinyl chloride; 0.1 to 15% by weight, preferably 1 to 8% by weight, of at least one monomer selected from vinyl monomers having one or more alcohol groups in their side chains; and 0 to 54.4% by weight, preferably 2 to 29% by weight, of at least one monomer selected from the group consisting of acrylates, methacrylates, acrylonitrile, methacrylonitrile, alkyl vinyl esters and alkyl vinyl ethers, where any alkyl moiety preferably has 1 to 8 carbon atoms.

DETAILED DESCRIPTION OF THE INVENTION

In the copolymers according to this invention, if the amount of the monomer selected from vinylidene chloride and vinyl chloride is smaller than 45% by weight, the copolymer loses its hydrophobic property, resulting in the weakening of the film strength of the subbing layer in the wet state. If the amount of the monomer selected from vinyl compounds having one or more alcohol groups in their side chains is greater than 16% by weight, latexes of the copolymer become unstable and change into a slurry state; on the contrary, if it is smaller than 0.1% by weight, tenacious adhesion cannot be obtained between a polyester film and a hydrophilic organic colloid layer thereon. It is preferred that the size of latex be about 0.01 to about 5 $\mu$, more preferably 0.05 to 1.0 $\mu$, though this is not absolutely limitative.

In this invention, a vinyl monomer having one or more alcohol groups in its side chain(s) means a compound having in the same molecule at least one polymerizable vinyl group and at least one alcohol group. It is preferred that the number of —OH groups in the vinyl monomer be 1 to 3, most preferably 1. In general, acrylates or methacrylates are preferred for vinyl monomers. Examples of such compounds include hydroxyethyl acrylate, hydroxyethyl methacrylate, hydroxypropyl methacrylate, hydroxypropyl acrylate, 3-chloro-2-hydroxypropyl acrylate, 3-chloro-2-hydroxypropyl methacrylate, 2,2-dimethylhydroxypropyl acrylate, 5-hydroxypentyl acrylate, diethylene glycol monoacrylate trimethylolpropane monoacrylate, pentaerythritol monoacrylate, 2,2-dimethyl-3-hydroxypropyl acrylate, 5-hydroxypentyl methacrylate, diethylene glycol monomethacrylate, trimethylolpropane monomethacrylate, pentaerythritol monomethacrylate, hydroxy-methylated N-(1,1-dimethyl-3-oxobutyl)acrylamide, N-methylolacrylamide, N-methylolmethacrylamide, N-ethyl-N-methylolmethacrylamide, N-ethyl-N-methylolacrylamide, N,N-dimethylolacrylamide, N-ethanolacrylamide, N-propanolacrylamide, N-methylolacrylamide and the like, as well as monomers that generate one or more alcohol groups during emulsion polymerization, such as glycidyl acrylate, glycidyl methacrylate, and the like.

Preferred monomers among the vinyl monomers described above are hydroxyalkyl acrylates, substituted hydroxyalkyl acrylates, hydroxyalkyl methacrylates, substituted hydroxyalkyl methacrylate and N-hydroxyalkylacrylamides, where any alkyl moiety preferably has 1 to 8 carbon atoms, and substituted groups includes halogen substituted acrylates or methacrylates, where a preferred halogen atom is chlorine.

Examples of acrylates include methyl acrylate, ethyl acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl acrylate, furfuryl acrylate, tetrahydrofurfuryl acrylate, phenyl acrylate, and the like.

Examples of methacrylates include methyl methacrylate, ethyl methacrylate, propyl methacrylate, isopropyl methacrylate, amyl methacrylate, hexyl methacrylate, cyclohexyl methacrylate, benzyl methacrylate, a cyanoacetoxy methacrylate, chlorobenzyl methacrylate, octyl methacrylate, N-ethyl-N-phenylaminoethyl methacrylate, 2-methoxyethyl methacrylate, 2-(3-phenylpropyloxyl)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, and the like.

Examples of alkyl vinyl ethers include methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, dimethylaminoethyl vinyl ether, diethylaminoethyl vinyl ether, butylaminoethyl vinyl ether, tetrahydrofurfuryl vinyl ether, vinyl phenyl ether, vinyl 2,4-dichlorophenyl ether, vinyl naphthyl ether, vinyl anthranyl ether, and the like.

Examples of alkyl vinyl esters include vinyl acetate, vinyl propionate, vinyl butyrate, vinyl isobutyrate, vinyl dimethylpropionate, vinyl ethylbutyrate, vinyl valerate, vinyl caproate, vinyl chloroacetate, vinyl dichloroacetate, vinyl methoxyacetate, vinyl butoxyacetate, vinyl phenylacetate, vinyl lactate, vinyl $\beta$-phenylbutyrate, vinyl cyclohexylcarboxylate, vinyl benzoate, vinyl salicylate, vinyl chlorobenzoate, vinyl tetrachlorobenzoate, vinyl naphthoate, and the like.

The preferred monomers in the group described above include an alkyl acrylate or alkyl methacrylate, where any alkyl moiety preferably has 1 to 8 carbon atoms.

Among the above described polymers of the present invention, preferred terpolymers contain from 45 to 99.5% by weight of vinylidene chloride; from 0.1 to 15% by weight of at least one vinyl monomer selected from hydroxyalkyl acrylates, halogen substituted hydroxyalkyl acrylates, hydroxyalkyl methacrylates, halogen substituted hydroxyalkyl methacrylates and N-hydroxyalkylacrylamide; and from 0 to 54.4% by weight of an alkyl acrylate or alkyl methacrylate; wherein any alkyl moiety has from 1 to 8 carbon atoms, and wherein any halogen is preferably a chlorine atom.

On emulsion polymerization of these monomers, there may advantageously be used surface active agents (in an amount of 0.1 to 10 wt% based on the monomer, preferably 0.5 to 2 wt%, same basis), including nonionic (such as polyvinyl alcohol, partially saponified vinyl acetate, polyethylene oxide, polyethylene oxide derivatives, for example,

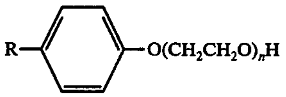

where R is a 9 carbon atom alkyl group and $n$ is 10 or 15, and $R'—O(CH_2CH_2O)_{n'}H$ where R' is a 12 carbon atom alkyl group and $n'$ is 10 or 15, hydroxyethyl cellulose, methyl cellulose, styrene-maleic acid copolymers, vinyl acetate-maleic acid copolymers, and methyl vinyl ether-maleic acid copolymers), cationic (such as dodecyltrimethylammonium chloride, tetradecyldimethylbenzylammonium chloride, and dodecylisoquinolium bromide) and anionic surface active agents (such as sodium lauryl sulfate, sodium dodecylbenzene sulfonate, and sodium dodecylbenzene carboxylate). Examples of surface active agents particularly useful in this invention include:

$C_{12}H_{25}SO_3Na$,

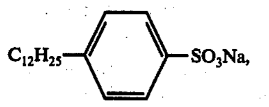

and

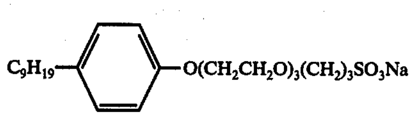

As polymerization initiators, there may be used organic or inorganic peroxides or their salts, such as peracetic acid, acetyl peroxide, benzoyl peroxide, lauryl peroxide, hydrogen peroxide, percarbonates, persulfates, perborates, and the like.

There may also be used inorganic hydrogen containing oxidative sulfur compounds, such as sulfur dioxide, sodium hydrogen sulfite, sodium sulfite, sodium metasulfite, ammonium sulfite, etc., as well as water soluble fatty tertiary amines, such as trimethanolamine, diethanolamine, and the like.

Aqueous dispersions of the copolymer used in this invention can be conveniently prepared by the methods described in U.S. Pat. Nos. 2,698,240 and 3,501,301; Japanese Patent Publication No. 3,437/55; and the like. It is a matter of course that polymerization conditions such as the kind of initiator used, concentrations, polymerization temperature, reaction time, etc., can be readily and widely varied depending on the necessity. The aqueous dispersion preferably contains about 1 to about 60 wt% copolymer, more preferably 20 to 50 wt%, based on the dispersion weight.

Preferred examples of copolymers used in the subbing compositions of the invention include:

A copolymer of vinylidene chloride-methyl acrylate-hydroxyethyl acrylate (83:12:5, percent by weight); a copolymer of vinylidene chloride-ethyl methacrylate-hydroxypropyl acrylate (82:10:8, percent by weight); a copolymer of vinylidene chloride-methyl methacrylate-3-chloro-2-hydroxypropyl acrylate (84:9:7, percent by weight); a copolymer of vinylidene chloride-methyl methacrylate-N-ethanolacrylamide (85:10:5, percent by weight); a copolymer of vinyl chloride-vinylidene chloride-n-butyl acrylate-hydroxyethyl methacrylate (50:30:16:4, percent by weight); and a copolymer of vinylidene chloride-hydroxyethyl methacrylate (92:8, percent by weight).

Exemplary illustrations of the preparation of copolymers used in the invention are given below.

PREPARATION 1

In a reaction vessel were mixed the following components:

| | | |
|---|---|---|
| Vinylidene chloride | 83 | g |
| Methyl acrylate | 15 | g |
| Hydroxyethyl acrylate | 5 | g |
| Water | 100 | g |
| Ammonium persulfate | 0.5 | g |
| Sodium metasulfite | 0.25 | g |
| Sodium dodecylsulfonate | 2 | g |

The reaction vessel was heated to about 35° C, and the stirring of the mixture was continued until the reaction of the vinylidene chloride was completed, that is, until refluxing of the vinylidene chloride had ceased. About 1 hour and 50 minutes was required for the reaction. An aqueous dispersion of vinylidene chloride-methyl methacrylate-hydroxyethyl acrylate copolymer was obtained (molar ratio 83:12:5, respectively, molecular weight: ca. 500,000), which had an average particle size of 0.1 μ.

PREPARATION 2

Into a three-necked flask equipped with a stirrer and a reflux condenser were placed the following materials:

| | | |
|---|---|---|
| vinylidene chloride | 84 | g |
| Ethyl methacrylate | 9 | g |
| 3-chloro-2-hydroxypropyl acrylate | 7 | g |
| Ammonium persulfate | 0.35 | g |
| Sodium metasulfite | 0.17 | g |
| Water | 100 | g |
| 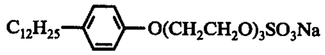 | 2.0 | g |

The mixture was heated to about 35° C and stirred for about 8 hours at the same temperature until refluxing of vinylidene chloride ceased to obtain a latex (molar ratio of vinylidene chloride : ethyl methacrylate : 3-chloro-2-hydroxy-propyl acrylate 32 84:9:7; molecular weight ca. 300,000) of dispersed copolymer particles about 0.3 μ in diameter.

PREPARATION 3

Into a three-necked flask equipped with a stirrer and a reflux condenser were placed the following materials:

| | | |
|---|---|---|
| Vinylidene chloride | 94 | g |
| Hydroxypropyl acrylate | 6 | g |
| Ammonium persulfate | 2 | g |
| Sodium sulfite | 1 | g |
| Water | 90 | ml |
| 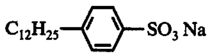 | 2 | g |

The reaction vessel was heated to about 35° C, and the reaction mixture was stirred for 8 hours until refluxing of vinylidene chloride ceased to obtain a latex of dispersed copolymer (molar ratio of vinylidene chloride and hydroxypropyl acrylate = 94:6; molecular weight ca. 600,000) particles about 0.2 μ in diameter.

If desired, the subbing dispersions used in this invention can have added thereto colloid stabilizers or thickeners such as gelatin, polyvinyl alcohol, polyvinyl, pyrrolidone, etc.; coating aids, such as saponin, sodium alkylbenzenesulfonates containing from 8 to 20 carbon atoms in the alkyl group(s), etc.; and antistatic agents, such as alkyl sulfonates, alkylamines, quaternary ammonium salts etc.

The dry thickness of the subbing layer is preferably about 0.05 to about 5 μ, more preferably 0.1 to 1.0 μ, though this is not absolutely limitative.

The subbing dispersions used in this invention may also have added thereto matting agents, including inorganic ones such as silicon dioxide, titanium dioxide, etc.; and organic ones, such as those described in Japanese Patent Publication No. 28,324/72.

The subbing dispersions used in the invention do not necessarily require the addition of organic solvents, but small amounts (up to several percent, by weight, generally up to 5% by weight) of hydrophilic organic solvents, such as methyl cellosolve, etc., may be added thereto.

The subbing dispersions used in the invention may also have added thereto swelling agents for polyesters, such as phenol and resorcin, as well as those described in U.S. Pat. Nos. 3,245,937, 3,143,421, 3,501,301 and 3,271,178.

The subbing dispersions of the invention may also have added thereto naturally occurring or synthetic hydrophilic polymers, such as gelatin, polyvinyl alcohol, polyvinyl pyrrolidone, polyacrylamide, copolymers of maleic anhydride and vinyl monomers such as with methyl vinyl ether, styrene, ethylene, etc., and the like.

The subbing compositions used in this invention may also have added thereto hardeners (usually in an amount of about 1 to about 10 wt%, preferably 3 to 6 wt%, based on copolymer weight), including triazines, such as those described in U.S. Pat. Nos. 3,325,287, 3,288,775 and 3,549,377; Belgian Pat. No. 6,602,226, etc.; dialdehydes, such as those described in U.S. Pat. Nos. 3,291,624, and 3,232,764; French Pat. No. 1,543,694; British Pat. No. 1,270,578, etc.; epoxides, such as those described in U.S. Pat. No. 3,091,537; Japanese Patent Publication No. 26,580/74, etc.; vinyl compounds, such as those described in U.S. Pat. No. 3,642,486, etc.; aziridines, such as those described in U.S. Pat. No. 3,392,024; ethyleneimines, such as those described in U.S. Pat. No. 3,549,378; and methylol compounds.

Of these hardeners, particularly useful are epoxides such as polyamide-epichlorohydrin resin known by the trade name "Kaimen" (Hercules Co. Ltd.), etc., triazines, such as

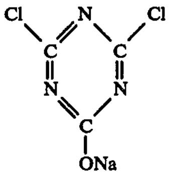

dialdehydes, such as

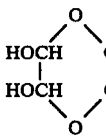

and

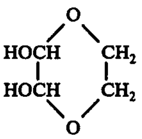

methylol compounds, such as

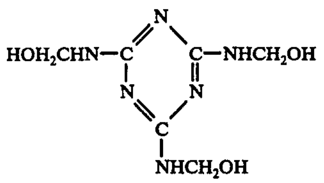

, etc.

The hardeners may be added at a concentration of about 0.001 to about 30 g per liter of the subbing composition.

In practicing the invention, there may be applied either a single subbing layer or a plurality of subbing layers. In the latter case, combinations of the subbing compositions may be arbitrarily varied, so that a variety of additives can be advantageously incorporated therein.

For example, there may be coated on one surface of a support: (a) an aqueous subbing composition containing one or more of the copolymers of the invention and additives such as swelling agents for polyesters, etc. (first subbing layer), and thereon (b) an aqueous gelatin dispersion containing gelatin, a hardener, colloidal silica, etc. (second subbing layer).

As examples of particularly useful hardeners of the aforesaid hardeners incorporated in the second subbing layer, mention may be made of polyamide-epichlorohydrin resins, and those of the following formulae:

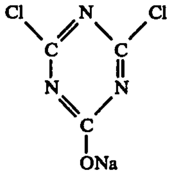

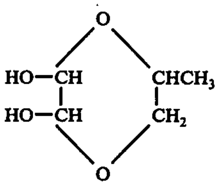

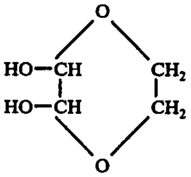

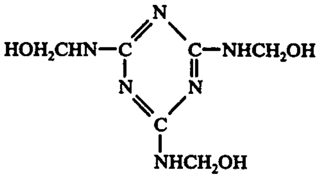

These hardeners show excellent effects in improving adhesion, presumably because they are capable of reacting with alcohol groups in the side chains of the copolymers according to this invention contained in the first subbing layer, and with gelatin or the like in the second subbing layer. The amount of the hardeners added to such a gelatin containing subbing layer used as a second subbing layer is preferably from about 0.001 to about 30 g per liter of said subbing solution.

The addition of colloidal silica (e.g., "Snow Tex" made by Nissan Chemical Industries, Ltd.) to the second subbing layer improves the adhesive strength of the layer. The amount of colloidal silica added to the second subbing layer is from 1/10 to 3 times, preferably the equivalent weight of the gelatin.

The subbing compositions of the invention can be coated on polyester films by various coating procedures, including dip coating, air knife coating, roller bead coating, curtain coating, gravure coating, extrusion coating, and multi-coating as described in U.S. Pat. Nos. 3,474,758 and 2,761,791, for example. If desired or necessary, two or more of layers may be coated at the same time.

The coating compositions of the invention typically contain from about 0.5 to about 400 g, preferably from about 1.0 to about 100 g, of the copolymer(s) of this invention per liter of the subbing composition, but the amount may be varied depending on the use.

The amount of the subbing compositions of this invention to be coated on polyester film is not particularly limited and may be varied over a wide range depending on its use and purpose, but it is generally from about 0.1 to about 100 g, preferably from about 5 to about 50 g, per square meter.

By polyester is meant herein a polymer whose major components are aromatic dibasic acids and glycols. As typical examples of aromatic dibasic acids, mention may be made of terephthalic acid, isophthalic acid, p-hydroxyethoxybenzoic acid, diphenylsulfonedicarboxylic acid, diphenoxyethanedicarboxylic acid, adipic acid, sebacic acid, azelaic acid, sodium 5-sulfoisophthalate, diphenylenedicarboxylic acid, 2,6-naphthalenedicarboxylic acid, and the like. As typical examples of glycols, mention may be made of ethylene glycol, propylene glycol, butanediol, neopentylene glycol, 1,4-cyclohexanediol, 1,4-bisoxyethoxybenzene, bisphenol A, diethylene glycol, polyethylene glycol, and the like.

Among polyesters consisting mainly of these components, polyethylene terephthalate is most convenient in view of its availability. Therefore, mention will be made hereinafter of examples using polyethylene terephthalate.

Any support can be employed in the practice of this invention so long as it has a polyester surface, including those having a polyester layer supported on the surface of another support. For example, there can be employed those comprising a polyester film laminated on various transparent, translucent, or opaque supports, such as a cellulose triacetate film, a polystyrene film, a polycarbonate film, a polypropylene film or laminates thereof, a glass plate, a baryta paper, a resin coated paper (e.g., a paper laminated with a polyethylene film), a synthetic paper, a metal plate, and the like.

The thickness of the polyester films or layers is not particularly limited, but from the viewpoint of ease of handling and diversity of use, it is preferably from about 12 μ to about 500 μ, more preferably from about 40 μ to about 200 μ. It is particularly preferred to use a biaxially stretched and heat set polyester film because of its stability, stiffness, and the like. Typical of such materials are those described in U.S. Pat. No. 2,736,066 (stretching techniques for PET), U.S. Pat. No. 2,718,666 (stretching and thermosetting techniques for PET) and in Japanese Patent Publication No. 5,639/55 (stretching and thermosetting techniques for PET).

Although the description of this invention is restricted herein to photographic applications, the art of this invention can naturally be applied in any field requiring adhesion between polymeric molding having a polyester surface and a hydrophilic resin.

The surface of the polyester films subbed in accordance with this invention may be untreated, but it is desirable to render it hydrophilic by various surface activation treatments, including one using solution of an oxidant as described, for example, in U.S. Pat. No. 2,943,937; UV irradiation treatment as described, for example, in U.S. Pat. No. 3,475,193; electric discharge treatment such as a corona discharge as described, for example, in U.S. Pat. No. 3,615,557; an active gas irradiation treatment as described, for example, in British Pat. No. 1,215,234; or a flame treatment as described in U.S. Pat. No. 3,590,107.

As examples of organic hydrophilic colloids used in the organic hydrophilic colloid layer of this invention, mention may be made of colloidal gelatin, albumin, casein, cellulose derivatives such as carboxymethylcellulose, hydroxyethylcellulose, etc., sugar derivatives such as agar-agar, sodium alginate, starch derivatives, etc., and synthetic hydrophilic colloids such as polyvinyl alcohol, poly-N-vinyl pyrrolidone, copolymers of acrylic acid with, e.g., acrylamide, ethyl acrylate, etc., polyacrylamide, and partially hydrolyzed products thereof. If desired, compatible mixtures of two or more of these colloids may be used.

Among these colloids, gelatin is most commonly used. Gelatin may be partially or wholly replaced by synthetic polymers as above described or by a gelatin derivative, such as those modified by a reagent having a functional group capable of reacting with a functional group contained in a gelatin molecule, such as amino, imino, hydroxyl, and carboxyl groups; or those grafted with chains of other polymeric substances. Examples of polymers to be grafted to gelatin are described in U.S. Pat. Nos. 2,763,625, 2,831,767 and 2,956,884; *Polymer Letters*, 5, 595 (1967); *Phot. Sci. Eng.*, 9, 148 (1965); *J. Polymer Sci., A*-1, 9, 3199 (1971); or the like; including polymers of vinyl compounds, such as acrylic acid, methacrylic acid or their derivatives (e.g., esters, amides, nitriles, etc.), or styrene. Among these polymers, hydrophilic vinyl polymers having some compatibility with gelatin, such as homo- or co-polymers of acrylic acid, acrylamide, methacrylamide, hydroxyalkyl acrylates, hydroxyalkyl methacrylates, etc., are particularly useful.

Among the hydrophilic organic colloid layers of the invention are included gelatin layers, layers comprised of a mixture of gelatin and a synthetic polymer as above described, synthetic polymer layers as above described, etc. As examples of such layers, mention may be made of antihalation layers containing black colloidal silver or an antihalation dye in an organic hydrophilic colloid (e.g., gelatin), light-sensitive silver halide layers, light-sensitive diazo resin layers, image receiving layers having oxidative metal salts dispersed in a hydrophilic organic colloid, mordant layers, dye developer containing layers, backing layers, overcoating layers containing gelatin, or the like.

As to the photographic emulsion layers used in the invention, a brief description will be given hereinafter.

As binders for photographic layers, there may be used hydrophilic organic colloids as described above. As light-sensitive silver halides, there may be used silver chloride, silver bromide, silver chlorobromide, silver iodobromide, silver chloroiodobromide, etc. As to the preparation and shape of the silver halide, description are given, for example in C. E. K. Mees, *The Theory of the Photographic Process*, Macmillan Co., 3rd Ed. (1966), New York.

The silver halide emulsions used in this invention can have added thereto chemical sensitizers, such as compounds capable of reacting with silver salts to form silver sulfide, e.g., sulfur compounds including sodium thiosulfate, etc.; reducing agents such as stannous salts, amines, etc.; gold compounds such as those described in U.S. Pat. No. 2,597,856; and salts of noble metals such as platinum, palladium, iridium, rhodium and ruthenium; as well as quaternary ammonium salts such as those described in U.S. Pat. No. 2,271,623; and polyethylene glycol derivatives such as those described in U.S. Pat. No. 2,708,162.

The photographic emulsions used in this invention can have added thereto anti-fogging agents ordinarily used in the art, including mercury compounds such as those described in U.S. Pat. No. 2,728,663; benzothiazolium salts such as those described in U.S. Pat. No. 2,131,038; nitroazoles such as those described in British Pat. No. 403,789; phenylmercaptotetrazoles such as those described in U.S. Pat. No. 2,403,927; mercapto compounds such as those described in British Pat. No. 893,428; azaindenes, urazoles, or the like.

The photographic emulsions used in the invention can contain surface active agents, such as saponin, polyethylene glycol ethers, acylated urethanes, maleopimarates, or the like.

The photographic emulsion layers used in this invention may be hardened by various hardeners commonly used in the art, such as formaldehyde, halogen substituted acids such as those described in U.S. Pat. No. 2,080,019; acid anhydrides and acid halides such as those described in U.S. Pat. Nos. 2,725,294 and 2,722,529; chlorotriazines such as those described in Japanese Patent Publication No. 6,151/72; 2,3-dihydroxydioxane; sodium bisulfite adducts of aldehyes; and the like.

The photographic emulsions used in this invention may have added thereto latexes with the purpose of improving their dimensional stability. Examples of useful latexes include those comprising acrylate-sulfoester copolymers such as those described in U.S. Pat. No. 3,411,911; acrylate-sulfobetaine copolymers such as those described in U.S. Pat. 3,411,912; alkylacrylateacrylic acid copolymers such as those described in U.S. Pat. No. 3,287,289; or copolymers such as described in U.S. Pat. No. 3,488,708.

In practicing this invention with color photographic materials there may be used any color forming coupler as is commonly used in the art, including 2- or 4-equivalent couplers, colored couplers, development inhibitor releasing couplers, and the like.

The light-sensitive emulsion layers or other photographic layers used in this invention may also have added thereto matting agents, such as fine grains of starch, barium sulfate, silicon dioxide, titanium dioxide, magnesium dioxide, calcium carbonate, polymers of acrylic acid and methacrylic acid such as polymethyl methacrylate, polycarbonate, and homo- and copolymers of styrene.

As examples of photographic light-sensitive elements having a subbing layer according to this invention, mention may be made of those comprising a polyester support having coated on at least one of its surfaces a subbing layer applied from a dispersion prepared by dilution of the above described polymer dispersion with water and having thereon hydrophilic colloid layers, such as photographic emulsion layers, etc.

The subbing compositions of the invention may be applied, for example, to black-and-white negative films, black-and-white reversal films, black-and-white positive films, black-and-white papers, printing films (e.g., lith films), X-ray films, black-and-white direct positive films, color negative films, color positive films, color papers, color direct positive films, photosensitive elements for black-and-white and color diffusion transfer processes, or non-silver salt light-sensitive elements, such as diazo films, and the like.

In addition, the subbing compositions of this invention can also be applied to polyester film bases or polyester moldings used for non-photographic applications.

Although the description of this invention set forth hereinbefore was made solely for the application to polyesters, the application of the compositions of this invention is not limited to polyesters, that is, they can be applied to other materials such as films of cellulose esters, such as cellulose nitrate, cellulose acetate, etc., polyvinyl chloride film, polyvinyl acetal film, polystyrene film, polycarbonate film, films of polyamides, such as nylon, etc., paper coated with α-olefin polymers, and the like.

The subbing compositions of this invention that exist in the form of an aqueous dispersion can be coated as they are without being mixed with a gelatinous polymeric substance as is required in the prior art.

Photographic light-sensitive elements having a subbing layer obtained by the process of this invention have tenacious adhesion not only between the subbing layer and the hydrophilic colloid layers, but between the subbing layer and the polyester base in both the wet and dry state, and its adhesive property is not deteriorated after development or even after a long period of time.

The subbing layer according to this invention has no photographically adverse effect, and is capable of providing tenacious adhesion.

The subbing dispersions of this invention can be used in the form of an aqueous dispersion without the use of any organic solvent, so that the use of the subbing dispersion results in reduced danger of pollution and explosion, as well as a reduced possibility of injuring the health of operators.

By the use of the method of this invention, there can be obtained photographic light-sensitive elements having good dimensional stability and plainness, as well. The method of this invention is also advantageous from the viewpoint of economy since it is relatively easy to recover polyester from polyester films subbed by the method of this invention.

This invention is characterized by the addition into subbing composition for plastic films of one or more copolymers of vinyl or vinylidene chloride and a vinyl monomer containing an alcohol group in its side chain. It is a matter of course that other components can be arbitrarily selected from the above described additives, depending upon particular applications.

The molecular weight of the copolymers of the present invention is not particularly limited so long as they can form a dispersion of solid particles. Usually the molecular weight ranges from about 10,000 to about 1,000,000, more preferably from 100,000 to 800,000.

Examples of this invention are set forth below. In the following Examples, the adhesion between the emulsion layer and the support was tested in the following manners.

(1) ADHESION TEST OF DRY FILMS

On the emulsion surface to be tested were made seven parallel scratches, and then seven additional parallel scratches were made perpendicular thereto to give 36 squares having a side of 7 mm in length. An adhesive tape ("Nitto Tape" made by Nitto Electric Industry Co., Ltd.) was adhered to the emulsion surface, and then pulled off rapidly at 180°. In this test, Grade A refers to the case where more than 90% of the emulsion layer was unpeeled; Grade B, more than 60% up to 90%; and Grade C, less than 60%. In order to obtain practically sufficient photographic elements, the adhesive strength according to this test must be A.

(2) ADHESION TEST OF WET FILMS

At each stage of development, fixing, and washing, two mutually perpendicular intersecting scratches were made on the emulsion surface with a steel pen, and the emulsion surface was strongly rubbed five times with a finger tip. The adhesive strength is evaluated by the maximum width of the peeled emulsion layer. In this test, Grade A refers to the case where the emulsion layer was not peeled off beyond the scratch; Grade B, less than 5 mm was peeled; and Grade C, more than 5 mm was peeled. In order to obtain practically sufficient photographic elements, the adhesive strength according to the test must be B, preferably A.

In the following Examples, all "parts" are by weight.

EXAMPLE 1

A polyethylene terephthalate film having a width of 30 cm and a thickness of 100 μ was subjected to a corona discharge treatment, which was carried out at a discharge power of 500 w through a gap of 0.8 mm, while moving the film at a rate of 10 m/min. Onto this film was coated the following Subbing Composition 1 at a laydown of about 40 ml per square meter of the film, which was then dried for 3 minutes at 120° C.

| Subbing Composition 1 | parts |
|---|---|
| Latex prepared in Preparation 1 | 4 |
| Pyrogallol | 3 |
| 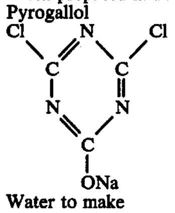 | 0.05 |
| Water to make | 100 |

Onto this subbed film was coated a conventional gelatin silver iodobromide emulsion having an iodide content of 2.5 mol%, at a coverage of 3 g of silver and 3.5 g of gelatin per square meter, which was then dried. The thus obtained film was subjected to the above adhesion tests, the results of which were as follows:

Adhesion in the dry state: A

Adhesion in the wet state: A

The thus obtained film exhibited good photographic properties.

A photographic film was prepared by directly coating the same emulsion as above onto the same corona discharged film without applying Subbing Composition 1. The adhesive strength of this film was C in both the dry and the wet state.

EXAMPLE 2

A polyethylene terephthalate film having a width of 30 cm and a thickness of 100 μ was subjected to a flame treatment using a burner held at a distance of 3.5 cm from the film and burning a mixed gas of propane and oxygen, while moving the film at a rate of 40 m/min.

Onto this film was coated the following Subbing Composition 2 at a laydown of about 20 ml of the composition per square meter of the film, which was then dried for 4 minutes at 110° C.

-continued

| Coating Composition 2 | parts |
|---|---|
| Latex prepared in Preparation 2 | 3 |
| Water to make | 100 |

Onto this subbed film was coated the following aqueous gelatin solution at a laydown of about 20 ml per square meter of the film, which was then dried for 3 minutes at 100° C.

| Aqueous Gelatin Solution | parts |
|---|---|
| Gelatin | 1 |
| Saponin | 0.1 |
| 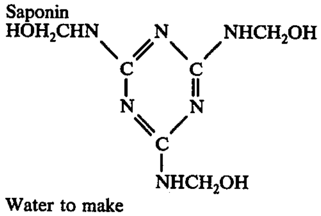 | 0.05 |
| Water to make | 100 |

A photographic film was prepared by directly coating the photographic emulsion described in Example 1 on the above corona discharged polyethylene terephthalate film without applying Subbing Composition 2 or the aqueous gelatin solution. The adhesive strength of the thus prepared film was C in both the dry and wet states.

A photographic film was prepared by coating on the above corona discharge treated polyethylene terephthalate film with the following composition:

| Subbing Composition 3 | parts |
|---|---|
| Latex of vinylidene chloride, methyl methacrylate and acrylic acid | 1 |
| Water to make | 100 |

at a laydown of about 20 ml per square meter of said film, and then coating thereon the above described aqueous gelatin solution at a laydown of about 20 ml per square meter of the film. The subbing composition was dried for 4 minutes at 110° C, and the aqueous gelatin solution was dried for 3 minutes at 100° C. The adhesive strength of the thus prepared film was B in both the dry and wet states, and it had a tendency to be desensitized under high temperature and high humidity conditions.

A photographic film was prepared by coating the above described photographic emulsion upon the surface of Subbing Composition 2 without applying the aqueous gelatin solution. The adhesive strength of the thus prepared film was A in both the dry and wet states, but it was somewhat inferior to that of the above photographic film in which the aqueous gelatin solution was applied on the subbing composition layer.

EXAMPLE 3

Onto a polyethylene terephthalate film having a thickness of 100 μ was coated the following Subbing Composition 4 at a laydown of about 30 ml per square meter of the film, which was then dried for 3 minutes at 120° C.

| Subbing Composition 4 | parts |
|---|---|
| Latex prepared in Preparation 3 | 5 |
| Resorcinol | 2 |
| Saponin | 0.01 |

-continued

| Subbing Composition 4 | parts |
|---|---|
| Water to make | 100 |

Onto this subbed film was coated the following aqueous gelatin solution:

| Aqueous Gelatin Solution | parts |
|---|---|
| Gelatin | 0.5 |
| Saponin | 0.1 |
| 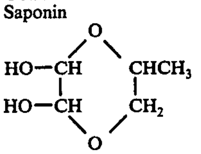 | 0.05 |
| Water to make | 100 |

at a laydown of about 20 ml per square meter of the film, which was then dried for 3 minutes at 100° C.

Onto this film was coated a photographic emulsion similar to that used in Example 1. The adhesive strength of the thus prepared photosensitive film was A in both the dry and wet states. In addition, the photographic film exhibited good photographic properties.

While the invention has been described in detail and with reference to specific embodiments thereof, it will be apparent to one skilled in the art that various changes and modifications can be made therein without departing from the spirit and scope thereof.

What is claimed is:

1. A method of subbing a photographic support having a polyester surface comprising applying to said polyester surface an aqueous subbing composition containing an aqueous dispersion of a polymer of (1) 45 to 99.5% by weight of at least one monomer selected from the group consisting of vinylidene chloride and vinyl chloride; (2) 0.1 to 15% by weight of at least one monomer selected from vinyl monomers having one or more alcohol groups in their side chains; and (3) 0 to 54.4% by weight of at least one monomer selected from the group consisting of acrylates, methacrylates, acrylonitrile, methacrylonitrile, alkyl vinyl esters and alkyl vinyl ethers.

2. The method of claim 1, wherein said polymer is a copolymer of 70 to 99% by weight of monomer (1); 1 to 8% by weight of monomer (2); and 2 to 29% by weight of monomer (3).

3. The method of claim 1, wherein said monomer (2) is selected from the group consisting of hydroxyethyl acrylate, hydroxyethyl methacrylate, hydroxypropyl methacrylate, hydroxypropyl acrylate, 3-chloro-2-hydroxypropyl acrylate, 3-chloro-2-hydroxypropyl methacrylate, 2,2-dimethylhydroxypropyl acrylate, 5-hydroxypentyl acrylate, diethylene glycol monoacrylate, trimethylolpropane monoacrylate, pentaerythritol monoacrylate, 2,2-dimethyl-3-hydroxypropyl acrylate, 5-hydroxypentyl methacrylate, diethylene glycol monomethacrylate, trimethylolpropane monomethacrylate, pentaerythritol monomethacrylate, hydroxymethylated N-(1,1-dimethyl-3-oxobutyl)acrylamide, N-methylolacrylamide, N-methylolmethacrylamide, N-ethyl-N-methylolmethacrylamide, N-ethyl-N-methylolacrylamide, N,N-dimethylol-acrylamide, N-ethanolacrylamide, N-propanolacrylamide, N-methylolacrylamide, glycidyl acrylate, and glycidyl methacrylate.

4. The method of claim 3, wherein said monomer (3) is an acrylate selected from the group consisting of methyl acrylate, ethyl acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl acrylate, furfuryl acrylate, tetrahydrofurfuryl acrylate and phenyl acrylate.

5. The method of claim 3, wherein said monomer (3) is a methacrylate selected from the group consisting of methyl methacrylate, ethyl methacrylate, propyl methacrylate, isopropyl methacrylate, amyl methacrylate, hexyl methacrylate, cyclohexyl methacrylate, benzyl methacrylate, a cyanoacetoxy methacrylate, chlorobenzyl methacrylate, octyl methacrylate, N-ethyl-N-phenylaminoethyl methacrylate, 2-methoxyethyl methacrylate, 2-(3-phenylpropyloxyl)ethyl methacrylate, dimethylaminophenoxyethyl methacrylate, furfuryl methacrylate, tetrahydrofurfuryl methacrylate, phenyl methacrylate, cresyl methacrylate, and naphthyl methacrylate.

6. The method of claim 3, wherein said monomer (3) is an alkyl vinyl ether selected from the group consisting of methyl vinyl ether, butyl vinyl ether, hexyl vinyl ether, octyl vinyl ether, decyl vinyl ether, ethylhexyl vinyl ether, methoxy-ethyl vinyl ether, ethoxyethyl vinyl ether, chloroethyl vinyl ether, 1-methyl-2,2-dimethylpropyl vinyl ether, 2-ethylbutyl vinyl ether, dimethylaminoethyl vinyl ether, diethylaminoethyl vinyl ether, butylaminoethyl vinyl ether, tetrahydrofurfuryl vinyl ether, vinyl phenyl ether, vinyl 2,4-dichlorophenyl ether, vinyl naphthyl ether and vinyl anthranyl ether.

7. The method of claim 3, wherein said monomer (3) is an alkyl vinyl ester selected from the group consisting of vinyl acetate, vinyl propionate, vinyl butyrate, vinyl isobutyrate vinyl dimethylpropionate, vinyl ethylbutyrate, vinyl valerate, vinyl caproate, vinyl chloroacetate, vinyl dichloroacetate, vinyl methoxyacetate, vinyl butoxyacetate, vinyl phenylacetate, vinyl lactate, vinyl β-phenylbutyrate, vinyl cyclohexylcarboxylate, vinyl benzoate, vinyl salicylate, vinyl chlorobenzoate, vinyl tetrachlorobenzoate, and vinyl naphthoate.

8. The method of claim 1, wherein there is further applied over said subbing layer a second subbing layer solution comprising gelatin.

9. The method of claim 8, wherein said second subbing layer solution further comprises a hardener for said gelatin.

10. The method of claim 9, wherein said second subbing layer solution comprises from about 0.001 to about 30 g per liter thereof of said hardener.

11. The method of claim 1, wherein said support is biaxially stretched polyethylene terephthalate.

12. The method of claim 1, wherein said vinyl monomer is selected from the group consisting of hydroxyalkyl acrylates, substituted hydroxyalkyl acrylates, hydroxyalkyl methacrylates, substituted hydroxyalkyl methacrylates, and N-hydroxyalkylacrylamides, where any alkyl moiety has 1 to 8 carbon atoms, and substituted groups include halogen substituted acrylates or methacrylates.

13. The method of claim 12, wherein any halogen is chlorine.

14. The method of claim 1, wherein any alkyl group has 1 to 8 carbon atoms.

15. The method of claim 1, wherein monomer (3) of said polymer is an alkyl acrylate or alkyl methacrylate, where any alkyl moiety has 1 to 8 carbon atoms.

16. The method of claim 1, wherein said polymer contains from 45 to 99.5% by weight of vinylidene chloride; from 0.1 to 15% by weight of at least one vinyl monomer selected from hydroxyalkyl acrylates, halogen substituted hydroxyalkyl acrylates, hydroxyalkyl methacrylates, halogen substituted hydroxyalkyl methacrylates and N-hydroxyalkylacrylamide; and from 0 to 54.4% by weight of an alkyl acrylate or alkyl methacrylate; wherein any alkyl moiety has from 1 to 8 carbon atoms.

* * * * *